United States Patent
Wu et al.

(10) Patent No.: US 11,133,961 B2
(45) Date of Patent: Sep. 28, 2021

(54) COMMUNICATION APPARATUS AND DIGITAL TO ANALOG CONVERSION CIRCUIT THEREOF

(71) Applicant: REALTEK SEMICONDUCTOR CORPORATION, Hsinchu (TW)

(72) Inventors: Chien-Ming Wu, Hsinchu County (TW); Chung-Ming Tseng, Taichung (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/147,495

(22) Filed: Jan. 13, 2021

(65) Prior Publication Data

US 2021/0218602 A1 Jul. 15, 2021

(30) Foreign Application Priority Data

Jan. 15, 2020 (TW) ................................. 109101385

(51) Int. Cl.
*H04L 25/02* (2006.01)
*H04B 3/03* (2006.01)
*H04L 25/49* (2006.01)

(52) U.S. Cl.
CPC ........... *H04L 25/0278* (2013.01); *H04B 3/03* (2013.01); *H04L 25/0272* (2013.01); *H04L 25/49* (2013.01)

(58) Field of Classification Search
CPC .......... H03M 1/68; H03M 1/785; H03M 1/00; H04L 25/0278; H04L 25/0272; H04L 25/49; H04B 3/03
See application file for complete search history.

(56) References Cited

U.S. PATENT DOCUMENTS

| | | | | |
|---|---|---|---|---|
| 2014/0167993 A1* | 6/2014 | Chiang | ................. | H03M 1/089 341/143 |
| 2018/0160368 A1* | 6/2018 | Wu | ...................... | H03M 1/002 |
| 2019/0036541 A1* | 1/2019 | Wong | ..................... | H03M 1/68 |
| 2019/0379288 A1* | 12/2019 | Chaput | ................. | H03M 1/462 |

OTHER PUBLICATIONS

Jan R. Westra et al., IEEE paper: "Design Considerations for Low-Power Analog Front Ends in Full-Duplex 10GBASE-T Transceivers", 2014 IEEE.

* cited by examiner

*Primary Examiner* — Sung S Ahn
(74) *Attorney, Agent, or Firm* — WPAT, PC

(57) ABSTRACT

The present disclosure discloses a communication apparatus including a receiver circuit and a transmitter circuit having a signal processing circuit and a DAC circuit having a primary conversion circuit and a first hybrid conversion circuit. The primary conversion circuit converts and transmits a transmission signal from the signal processing circuit to a signal transmission path. The first hybrid conversion circuit converts the transmission signal to a first receiver resistor to generate a voltage drop. The receiver circuit receives a first actual receiving signal through the signal transmission path and the first receiver resistor. The primary conversion circuit operates according to a first current including a first and a second part currents and the first hybrid conversion circuit operates according to a second current. The first part current does not change according to a resistive change. The second part current and the second current change according to the resistive change.

18 Claims, 2 Drawing Sheets

COMMUNICATION APPARATUS AND DIGITAL TO ANALOG CONVERSION CIRCUIT THEREOF

BACKGROUND OF THE INVENTION

1. Field of the Invention

The present disclosure relates to a communication apparatus and a digital to analog conversion circuit thereof.

2. Description of Related Art

A common communication apparatus includes a transmitter circuit and a receiver circuit. The transmitter circuit converts a signal to be transmitted from a digital form to an analog form and further transmits the converted signal to the corresponding transmission channel. The receiver circuit receives a signal from a corresponding transmission channel and converts the received signal from the analog form to the digital form.

The transmission of the signal of the transmitter circuit and the reception of the signal of the receiver circuit are both performed through resistors. The resistances of the resistors are easily changed due to the environment factors such that the amounts of currents of the signals are changed as well. However, an equivalent impedance of the transmission channel relative to the transmitter circuit is not easily changed according to the environment factors since the material thereof is different. As a result, due to the different characteristics of the resistors that the signal is transmitted through during the operation of the communication apparatus, the maintenance of the signal level becomes difficult.

SUMMARY OF THE INVENTION

In consideration of the problem of the prior art, an object of the present disclosure is to provide a communication apparatus and a digital to analog conversion circuit thereof.

The present disclosure discloses a digital to analog conversion (DAC) circuit used in a transmitter circuit that includes a primary conversion circuit and a first hybrid conversion circuit. The primary conversion circuit is configured to receive a transmission signal from a signal processing circuit of the transmitter circuit to perform a digital to analog conversion thereon to generate an actual transmission signal and to transmit the actual transmission signal through a transmission resistor to a signal transmission path. The first hybrid conversion circuit is configured to receive the transmission signal from the signal processing circuit to perform the digital to analog conversion thereon to generate a first reference transmission signal and to transmit the first reference transmission signal to a first reception resistor disposed between a receiver circuit and the signal transmission path to generate a voltage drop, such that the receiver circuit receives a first actual reception signal from the signal transmission path through the first reception resistor that generates the voltage drop. The primary conversion circuit operates according to a first current comprising a first part current and a second part current, and the first hybrid conversion circuit operates according to a second current, in which the first part current does not change according to a corresponding resistive change, and the second part current and the second current change according to the corresponding resistive change.

The present disclosure also discloses a communication apparatus that includes a receiver circuit and a transmission circuit. The transmission circuit includes a signal processing circuit and a DAC circuit. The signal processing circuit is configured to generate a transmission signal. The DAC circuit includes a primary conversion circuit and a first hybrid conversion circuit. The primary conversion circuit is configured to receive the transmission signal from the signal processing circuit to perform a digital to analog conversion thereon to generate an actual transmission signal and to transmit the actual transmission signal through a transmission resistor to a signal transmission path. The first hybrid conversion circuit is configured to receive the transmission signal from the signal processing circuit to perform the digital to analog conversion thereon to generate a first reference transmission signal and to transmit the first reference transmission signal to a first reception resistor disposed between the receiver circuit and the signal transmission path to generate a voltage drop, such that the receiver circuit receives a first actual reception signal from the signal transmission path through the first reception resistor that generates the voltage drop. The primary conversion circuit operates according to a first current comprising a first part current and a second part current, and the first hybrid conversion circuit operates according to a second current, in which the first part current does not change according to a corresponding resistive change, and the second part current and the second current change according to the corresponding resistive change.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a communication apparatus and a digital to analog conversion circuit thereof to provide currents having different characteristics to the DAC circuit based on the characteristics of the resistors such that the signal transmission level of the transmitter circuit and the receiver circuit is maintained without being affected by the resistors.

Figure 1:
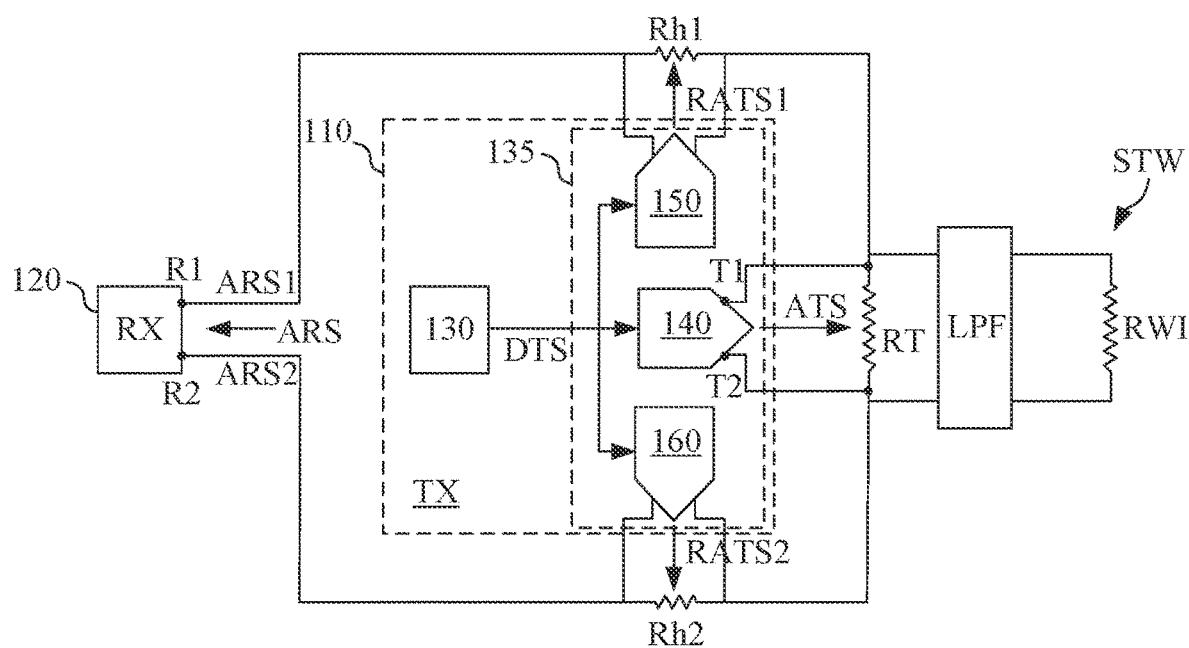
FIG. 1 illustrates a block diagram of a communication apparatus according to an embodiment of the present invention.

FIG. 1 illustrates a block diagram of a communication apparatus 100 according to an embodiment of the present invention. The communication apparatus 100 includes a transmission circuit 110 (labeled as TX in FIG. 1) and a receiver circuit 120 (labeled as RX in FIG. 1).

The transmission circuit 110 includes a signal processing circuit 130 and a DAC circuit 135.

In an embodiment, the DAC circuit 135 is part of the transmitter circuit 110. In the present embodiment, the DAC circuit 135 includes a primary conversion circuit 140, a first hybrid conversion circuit 150 and a second hybrid conversion circuit 160.

The signal processing circuit 130 is configured to generate a transmission signal DTS in a digital form such that a digital to analog conversion is performed on the transmission signal DTS by the primary conversion circuit 140 electrically coupled to the signal processing circuit 130 to generate an actual transmission signal ATS in an analog form. In an embodiment, the primary conversion circuit 140 includes a first transmission terminal T1 and a second transmission terminal T2 to output the actual transmission signal ATS in a differential manner.

In an embodiment, the first transmission terminal T1 and the second transmission terminal T2 of the primary conversion circuit 140 are electrically coupled to two terminals of a transmission resistor RT such that the actual transmission signal ATS is outputted through the first transmission terminal T1 and the second transmission terminal T2 to the transmission resistor RT, further to a signal transmission path STW through the transmission resistor RT and even further to an external network module (not illustrated) through the signal transmission path STW. In FIG. 1, the signal transmission path STW is illustrated as an equivalent impedance RWI relative to the primary conversion circuit 140.

In an embodiment, the transmission resistor RT and the signal transmission path STW may selectively include a low pass filter LPF to perform filtering on the actual transmission signal ATS.

The receiver circuit 120 includes a first reception terminal R1 and a second reception terminal R2. The first reception terminal R1 is electrically coupled to the first transmission terminal T1 through a first reception resistor Rh1 and further to the signal transmission path STW through the first transmission terminal T1 Similarly, the second reception terminal R2 is electrically coupled to the second transmission terminal T2 through a second reception resistor Rh2 and further to the signal transmission path STW through the second transmission terminal T2.

Through the paths described above, the receiver circuit 120 is configured to receive a reception signal ARS in the analog form in the differential manner through the same signal transmission path STW. Further, the receiver circuit 120 can convert the reception signal ARS to the digital form by using such as, but not limited to an analog to digital conversion circuit (not illustrated) disposed therein. In an embodiment, since the reception signal ARS is received in the differential manner, the reception signal ARS actually includes a first actual reception signal ARS1 received at the first reception terminal R1 and a second actual reception signal ARS2 received at the second reception terminal R2.

However, since the both the signal transmission of the transmitter circuit 110 and the signal reception of the receiver circuit 120 are performed through the signal transmission path STW, the receiver circuit 120 needs to remove the component corresponding to the actual transmission signal ATS from the total signal transmitted on the signal transmission path STW to obtain the real reception signal ARS.

As a result, corresponding to the first reception resistor Rh1, the first hybrid conversion circuit 150 is configured to receive the transmission signal DTS from the signal processing circuit 130 to perform the digital to analog conversion thereon to generate a first reference transmission signal RATS1 and to transmit the first reference transmission signal RATS1 to the first reception resistor Rh1 to generate a voltage drop, such that the receiver circuit 120 receives the first actual reception signal ARS1 from the signal transmission path STW through the first reception resistor Rh1 that generates the voltage drop.

On the other hand, corresponding to the second reception resistor Rh2, the second hybrid conversion circuit 160 is configured to receive the transmission signal DTS from the signal processing circuit 130 to perform the digital to analog conversion thereon to generate a second reference transmission signal RATS2 and to transmit the second reference transmission signal RATS2 to the second reception resistor Rh2 to generate a voltage drop, such that the receiver circuit 120 receives the second actual reception signal ARS2 from the signal transmission path STW through the second reception resistor Rh2 that generates the voltage drop.

In order to balance the first actual reception signal ARS1 and the second actual reception signal ARS2, the voltage drop generated by the first reception resistor Rh1 according to the first reference transmission signal RATS1 equals to the voltage drop generated by the second reception resistor Rh2 according to the second reference transmission signal RATS2.

Further, in order to make sure the component of the actual transmission signal ATS that is removed from the total signal transmitted on the signal transmission path STW exactly equals to the amount of the actual transmission signal ATS, the voltage drop generated by the transmission resistor RT according to the actual transmission signal ATS equals to the voltage drops generated by the first reception resistor Rh1 according to the first reference transmission signal RATS1 and generated by the second reception resistor Rh2 according to the second reference transmission signal RATS2.

In an embodiment, in order to accomplish a power-saving mechanism, the respective resistances of the first reception resistor Rh1 and the second reception resistor Rh2 are respectively larger than the resistance of the transmission resistor RT such that the first hybrid conversion circuit 150 and the second hybrid conversion circuit 160 can generate the first reference transmission signal RATS1 and the second reference transmission signal RATS2 having smaller amounts of currents to obtain the same amount of voltage drop.

Figure 2:
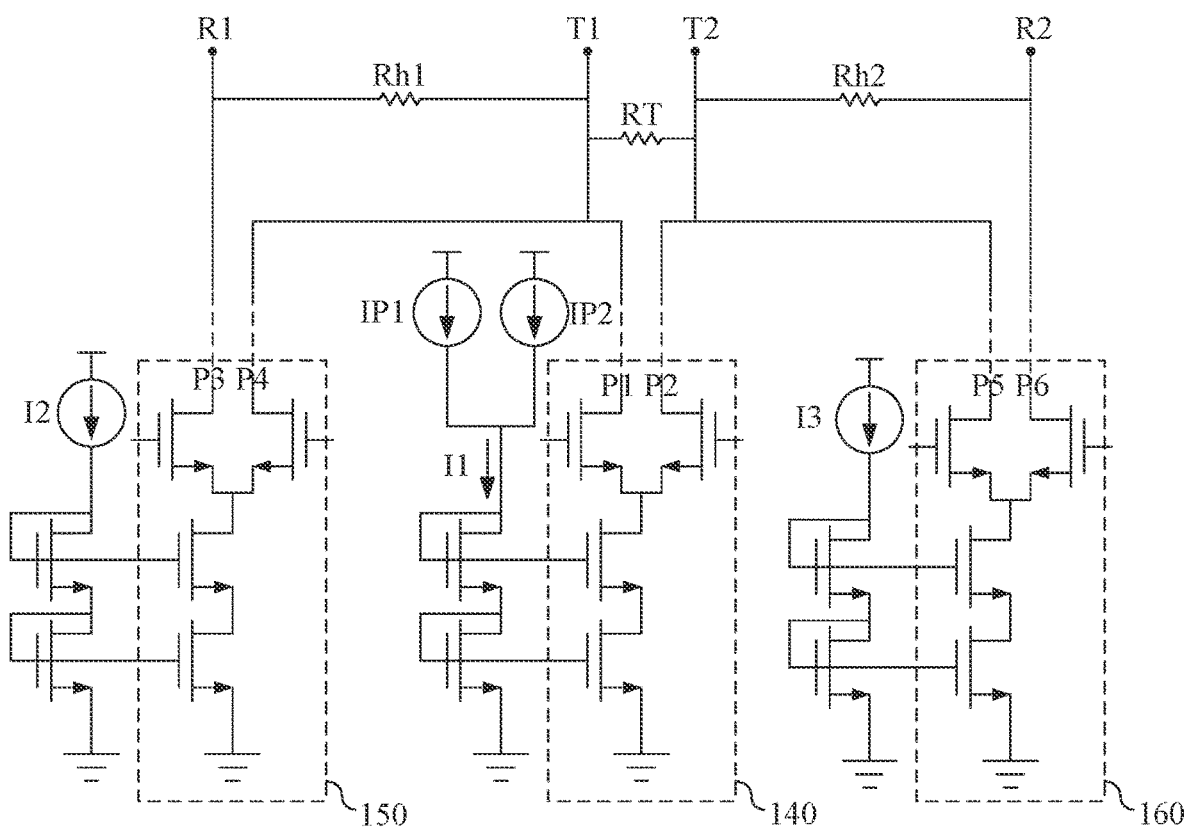
FIG. 2 illustrates a simplified circuit diagram of the DAC circuit, the transmission resistor, the first reception resistor and the second reception resistor in FIG. 1 according to an embodiment of the present invention.

Reference is now made to FIG. 2. FIG. 2 is a simplified circuit diagram of the DAC circuit 135, the transmission resistor RT, the first reception resistor Rh1 and the second reception resistor Rh2 in FIG. 1 according to an embodiment of the present invention.

It is appreciated that in FIG. 2, only the connection relation of the DAC circuit 135, the transmission resistor RT, the first reception resistor Rh1 and the second reception resistor Rh2 is illustrated. The connection relation of the DAC circuit 135, the signal processing circuit 130 and the receiver circuit 120 is not illustrated.

As illustrated in FIG. 2, the primary conversion circuit 140 of the DAC circuit 135 operates according to a first current I1 and extends to be coupled to the first transmission terminal T1 and the second transmission terminal T2 and further to the transmission resistor RT through a path P1 and a path P2 respectively. The first current I1 actually includes a first part current IP1 and a second part current IP2.

The first hybrid conversion circuit 150 operates according to a second current I2 and extends to be coupled to the first reception terminal R1 and the first transmission terminal T1 through a path P3 and a path P4 respectively. The second hybrid conversion circuit 160 operates according to a third current I3 and extends to be coupled to the second transmission terminal T2 and the second reception terminal R2 through a path P5 and a path P6 respectively.

Among the currents described above, the first part current IP1 does not change according to a corresponding resistive change. The second part current IP2, the second current I2 and the third current I3 change according to the corresponding resistive change.

More specifically, the first part current IP1 is a constant current. When the primary conversion circuit 140 operates according to the first current I1 to generate the actual transmission signal ATS, a part of the current of the actual transmission signal ATS does not change according to the corresponding resistive change due to the presence of the first part current IP1.

On the other hand, the second part current IP2, the second current I2 and the third current I3 are variable currents. When the primary conversion circuit 140 operates according to the first current I1 to generate the actual transmission signal ATS, another part of the current of the actual transmission signal ATS changes according to the corresponding resistive change, e.g. the resistive change of the resistor RT, due to the presence of the second part current IP2.

On the contrary, when the first hybrid conversion circuit 150 and the second hybrid conversion circuit 160 respectively operate according to the second current I2 and the third current I3 to generate the first actual reception signal ARS1 and the second actual reception signal ASR2, the currents of the first actual reception signal ARS1 and the second actual reception signal ASR2 change according to the change of the resistances of the first reception resistor Rh1 and the second reception resistor Rh2 due to the presence of the second current I2 and the third current I3.

In an embodiment, in order to maintain the amount of the signal level, when each of the resistances (e.g. the resistances of the transmission resistor RT, the first reception resistor Rh1 and the second reception resistor Rh2) that the variable currents correspond to becomes larger due to the temperature or other environment factors, the current amount of each of the second part current IP2, the second current I2 and the third current I3 becomes smaller. When each of the resistances that the variable currents correspond to becomes smaller due to the temperature or other environment factors, the current amount of each of the second part current IP2, the second current I2 and the third current I3 becomes larger.

When the communication apparatus 100 operates, the resistances of the transmission resistor RT, the first reception resistor Rh1 and the second reception resistor Rh2 change due to the effect of the temperature or other environment factors. In order to compensate such effect, the first current I1, the second current I2 and the third current I3 that drives the operation of the DAC circuit 135 needs to be changed. However, for the primary conversion circuit 140 electrically coupled to the signal transmission path STW directly through the transmission resistor RT, the equivalent impedance RWI of the signal transmission path STW affects the primary conversion circuit 140.

The transmission resistor RT, and the first reception resistor Rh1 and the second reception resistor Rh2 are usually fabricated by using the same fabrication process and are made of the same material. However, the signal transmission path STW and the resistors described above are made of different materials, in which the equivalent impedance RWI barely changes. If all the components of the first current I1 change along with the change of the resistance of the transmission resistor RT, the level of the actual transmission signal ATS changes under the condition that the equivalent impedance RWI does not change.

As a result, the DAC circuit 135 of the communication apparatus 100 of the present invention uses the primary conversion circuit 140 that operates according to the first current I1 that includes the first part current IP1 that does not change along with the change of the resistance and the second part current IP2 that changes along with the change of the resistance. A part of the current is adaptive to the change of the resistance due to the environment factors and another part of the current can be maintained to be unchanged in order to adapt to the equivalent impedance RWI that does not change. The effects of the internal resistors and the equivalent impedance of the signal transmission path can be avoided simultaneously.

In an embodiment, the amounts of the first part current IP1 and the second part current IP2 are the same such that the effects of the internal resistors and the equivalent impedance of the signal transmission path are balanced.

It is appreciated that the embodiments described above are merely an example. In other embodiments, it should be appreciated that many modifications and changes may be made by those of ordinary skill in the art without departing from the spirit of the invention.

In summary, the communication apparatus and the digital to analog conversion circuit thereof of the present invention can adapt to the change of the resistance of the inner resistor due to the effect of the environment factors and the unchanged of the equivalent impedance of the signal transmission path to maintain the signal transmission level of the transmitter circuit and the receiver circuit.

The aforementioned descriptions represent merely the preferred embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A circuit used in a transmitter circuit, comprising:
   a primary conversion circuit configured to receive a transmission signal from a signal processing circuit of a transmitter circuit to perform a digital to analog conversion thereon to generate an actual transmission signal and to transmit the actual transmission signal through a transmission resistor to a signal transmission path; and
   a first hybrid conversion circuit configured to receive the transmission signal from the signal processing circuit to perform the digital to analog conversion thereon to generate a first reference transmission signal and to transmit the first reference transmission signal to a first reception resistor disposed between a receiver circuit and the signal transmission path to generate a voltage drop, such that the receiver circuit receives a first actual reception signal from the signal transmission path through the first reception resistor that generates the voltage drop;
   wherein the primary conversion circuit operates according to a first current comprising a first part current and a second part current, and the first hybrid conversion circuit operates according to a second current, in which the first part current does not change according to a corresponding resistive change, and the second part current and the second current change according to the corresponding resistive change.

2. The circuit of claim 1, wherein the primary conversion circuit comprises a first transmission terminal and a second transmission terminal electrically coupled to two terminals of the transmission resistor to output the actual transmission signal to the transmission resistor through the first transmission terminal and the second transmission terminal and further to the signal transmission path through the transmission resistor.

3. The circuit of claim 2, wherein the first reception resistor is electrically coupled to a first reception terminal of the receiver circuit and is further electrically coupled to the signal transmission path through the first transmission terminal.

4. The circuit of claim 3, further comprising:
a second hybrid conversion circuit configured to receive the transmission signal from the signal processing circuit to perform the digital to analog conversion thereon to generate a second reference transmission signal and to transmit the second reference transmission signal to a second reception resistor disposed between the receiver circuit and the signal transmission path to generate the voltage drop, such that the receiver circuit receives a second actual reception signal from the signal transmission path through the second reception resistor that generates the voltage drop;
wherein the second reception resistor is electrically coupled to a second reception terminal of the receiver circuit and is further electrically coupled to the signal transmission path through the second transmission terminal, and the second hybrid conversion circuit operates according to a third current that changes according to the corresponding resistive change.

5. The circuit of claim 1, wherein when the corresponding resistances of the second part current and the second current become larger, current amounts of the second part current and the second current become smaller, and when the corresponding resistances of the second part current and the second current become smaller, the current amounts of the second part current and the second current become larger.

6. The circuit of claim 1, wherein the transmission resistor and the first reception resistor are made of the same material and the transmission resistor and the signal transmission path are made of different materials.

7. The circuit of claim 1, wherein current amounts of the first part current and the second part current are the same.

8. The circuit of claim 1, wherein the voltage drop generated by the actual transmission signal through the transmission resistor according to the first current equals to the voltage drop generated by the first reference transmission signal through the first reception resistor according to the second current.

9. The circuit of claim 8, wherein the resistance of the first reception resistor is larger than the resistance of the transmission resistor.

10. A communication apparatus comprising:
a receiver circuit; and
a transmission circuit comprising:
a signal processing circuit configured to generate a transmission signal; and
a digital to analog conversion (DAC) circuit comprising:
a primary conversion circuit configured to receive the transmission signal from the signal processing circuit to perform a digital to analog conversion thereon to generate an actual transmission signal and to transmit the actual transmission signal through a transmission resistor to a signal transmission path; and
a first hybrid conversion circuit configured to receive the transmission signal from the signal processing circuit to perform the digital to analog conversion thereon to generate a first reference transmission signal and to transmit the first reference transmission signal to a first reception resistor disposed between the receiver circuit and the signal transmission path to generate a voltage drop, such that the receiver circuit receives a first actual reception signal from the signal transmission path through the first reception resistor that generates the voltage drop;
wherein the primary conversion circuit operates according to a first current comprising a first part current and a second part current, and the first hybrid conversion circuit operates according to a second current, in which the first part current does not change according to a corresponding resistive change, and the second part current and the second current change according to the corresponding resistive change.

11. The communication apparatus of claim 10, wherein the primary conversion circuit comprises a first transmission terminal and a second transmission terminal electrically coupled to two terminals of the transmission resistor to output the actual transmission signal to the transmission resistor through the first transmission terminal and the second transmission terminal and further to the signal transmission path through the transmission resistor.

12. The communication apparatus of claim 11, wherein the first reception resistor is electrically coupled to a first reception terminal of the receiver circuit and is further electrically coupled to the signal transmission path through the first transmission terminal.

13. The communication apparatus of claim 12, wherein the DAC circuit further comprises:
a second hybrid conversion circuit configured to receive the transmission signal from the signal processing circuit to perform the digital to analog conversion thereon to generate a second reference transmission signal and to transmit the second reference transmission signal to a second reception resistor disposed between the receiver circuit and the signal transmission path to generate the voltage drop, such that the receiver circuit receives a second actual reception signal from the signal transmission path through the second reception resistor that generates the voltage drop;
wherein the second reception resistor is electrically coupled to a second reception terminal of the receiver circuit and is further electrically coupled to the signal transmission path through the second transmission terminal, and the second hybrid conversion circuit operates according to a third current that changes according to the corresponding resistive change.

14. The communication apparatus of claim 10, wherein when the corresponding resistances of the second part current and the second current become larger, current amounts of the second part current and the second current become smaller, and when the corresponding resistances of the second part current and the second current become smaller, the current amounts of the second part current and the second current become larger.

15. The communication apparatus of claim 10, wherein the transmission resistor and the first reception resistor are made of the same material and the transmission resistor and the signal transmission path are made of different materials.

16. The communication apparatus of claim 10, wherein current amounts of the first part current and the second part current are the same.

17. The communication apparatus of claim 10, wherein the voltage drop generated by the actual transmission signal through the transmission resistor according to the first current equals to the voltage drop generated by the first reference transmission signal through the first reception resistor according to the second current.

18. The communication apparatus of claim 17, wherein the resistance of the first reception resistor is larger than the resistance of the transmission resistor.

* * * * *